Dec. 28, 1926.
H. D. GEYER
PRESSED METAL STEERING WHEEL
Filed April 28, 1925
1,612,716
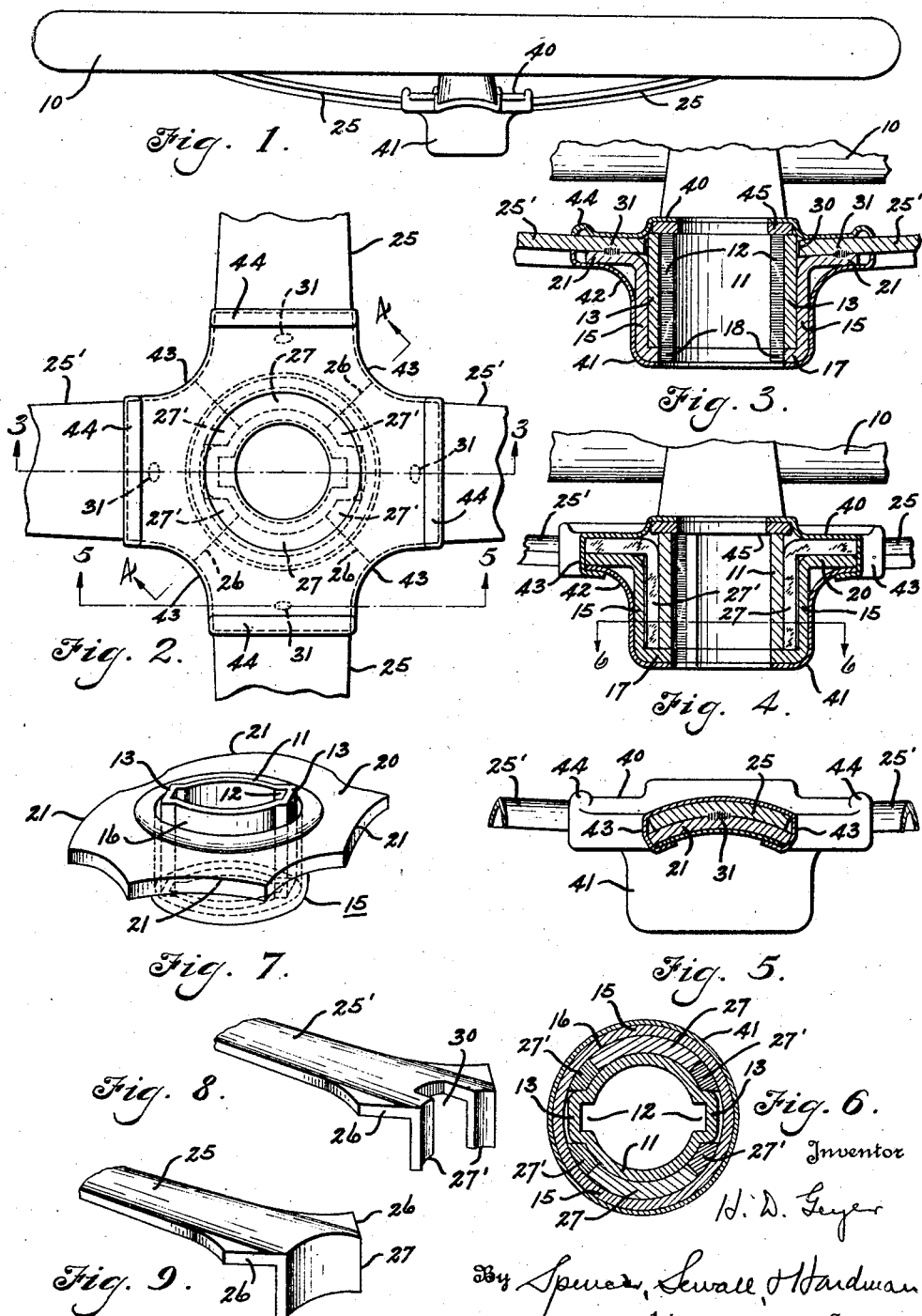

Patented Dec. 28, 1926.

1,612,716

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

PRESSED-METAL STEERING WHEEL.

Application filed April 28, 1925. Serial No. 26,422.

This invention relates to handwheels especially such as are ordinarily used as steering wheels on automotive vehicles.

A large item in the cost of manufacture of metal spiders for such steering wheels as ordinarily made is the cost of machining of the metal hub piece to accurately fit the steering shaft and other parts which are attached to said hub piece. This invention, however, provides a metal hub piece built up from pressed metal parts which require little or no machining and hence the cost thereof is greatly reduced. Also the cost of component pressed metal parts is very much less than the cost of cast metal hubs of malleable or grey cast iron such as are ordinarily used.

An object of this invention therefore is to provide a strong and efficient steering wheel of good appearance and which is capable of economical manufacture.

Further objects and advantages of the present invention will be apparent from the following description, reference being had to the accompanying drawings, wherein a preferred form of embodiment of the present invention is clearly shown.

In the drawings:

Fig. 1 is a side elevation of an automobile steering wheel built according to this invention.

Fig. 2 is an enlarged plan view of the central portion thereof.

Fig. 3 is a vertical section on line 3—3 of Fig. 2.

Fig. 4 is a vertical section on line 4—4 of Fig. 2.

Fig. 5 is a view on line 5—5 of Fig. 2.

Fig. 6 is a horizontal section through the hub on line 6—6 of Fig. 4.

Fig. 7 illustrates the two main hub parts assembled together before the spokes are in place.

Fig. 8 is a perspective view of one of the spokes which straddles the keyway in the central sleeve.

Fig. 9 is a perspective view of another of the spokes.

In the drawings similar reference characters refer to similar parts throughout the several views.

Numeral 10 designates the steering wheel rim which may be made in any well known manner and hence will not be described in detail herein.

The inner sleeve 11 of the hub is herein shown as of cylindrical form, that is, it is adapted to fit a cylindrical steering shaft rather than a tapered shaft, both forms of steering shafts now being common. This inner sleeve 11 is preferably made from a short length of low carbon seamless steel tubing. This tubing, which is of relatively thin ductile metal, has the two keyways 12 depressed therein by means of suitable dies, these keyway depressions forming the two longitudinal projections or "fins" 13 on the outer surface of the sleeve 11 (see Figs. 6 and 7).

The outer sleeve or cup member 15 is made of such diameter that it will telescope over the inner sleeve 11 leaving an annular space 16 between said sleeve and cup 15 (see Figs. 6 and 7). The cup 15 is provided at its bottom with an inwardly turned flange 17 upon which the sleeve 11 rests as clearly shown in Fig. 4. This inwardly turned flange 17 is cut away at 18 at the keyways 12 so as not to obstruct the keyways, as clearly shown in Fig. 3. The cup 15 is provided at its upper edge with the flange 20 which preferably is shaped with four projecting portions 21 which are adapted to fit snugly upon the under side of the four spokes 25 and 25' (see Figs. 3, 4 and 5). This cup member 15 is preferably made by drawing out by suitable dies in a manner well understood by those skilled in the art a piece of flat metal of sufficient ductility to permit such drawing operations. By this method the flange 20 may be made integral with the cup 15 and in a very economical manner.

The spokes 25 and 25' have their inner ends flared out to abut one another along their radial edges 26 clearly shown in Fig. 2. Each of the spokes 25 has its inner end turned down forming an arcuate depending projection 27 (see Fig. 9), which fits snugly within the annular space 16 between the inner sleeve 11 and cup 15. Each of the spokes 25' is similar to the spokes 25 with the exception that the depending projection is slotted out as clearly shown at 30 in Fig. 8, thus forming two arcuate depending projections 27' on each spoke 25'. These depending projections 27' are inserted within the annular space 16, the fins 13 on the inner sleeve 11 fitting snugly within the slots 30 (see Fig. 2). It is thus seen that the depending projections 27 and 27' on the inner ends of the spider spokes substantially fill the annular space 16. (See Fig. 6.) Preferably these depending projections have a tight pressed fit within the annular space 16 so that the inner sleeve 11, the cup 15, and the four spokes are held rigidly together by this means. In order to more permanently hold these parts in rigid relation each of the spokes is preferably spot welded to the projection 21, lying immediately thereunder as shown at 31 in Figs. 2 and 3. If desired, a plurality of spot welds in each spoke end may be used instead of only one as has been shown in the drawings.

The spoke and hub parts having now been rigidly secured together an outer casing of thin sheet metal is preferably provided to cover the hub and inner ends of the spokes to present a more finished appearance and to more rigidly hold the parts together. This outer casing preferably comprises a pressed metal top cover plate 40 and a lower pressed metal cup 41. The cup 41 fits snugly up around the cup 15 to completely conceal the same and its upper edge is flared outwardly, as shown at 42 in Figs. 3 and 4, to conform substantially with the shape of the inner ends of the spokes. The top cover plate 40 likewise conforms with the plan shape of the inner ends of the spokes, as clearly shown in Fig. 2, and is provided at the curved edge between the spokes with a depending flange 43 which conceals the edges of the spokes and flange 20 and is crimped over on the under side of the edge of cup 41 to hold both the cup 41 and top cover plate 40 securely in place (see Figs. 4 and 5). Preferably the top cover plate 40 is provided with the beads 44 at the edges thereof where it projects out along the spokes in order to give a neater appearance to said cover plate 40 (see Figs. 2 and 3). If desired, the cover plate 40 may lie flat over the inner ends of the spokes and the upper end of sleeve 11, but preferably an apertured disk 45 is provided which rests upon the upper end of sleeve 11, the cover plate 40 being raised at its center to overlie and hold in place this disk 45. This disk 45 extends over the keyways 12, as clearly shown in Fig. 3, and so backs up the relatively thin metal of the cover plate 40 at these points. The top cover plate 40 and lower cover cup 41 are preferably made of thin sheet aluminum which when polished gives a neat appearance to the central portion of the spider. A a handwheel spider is thus formed which is of pleasing appearance and which is very economical to manufacture since both the spokes and the hub parts are made of die-pressed metal which require no machining in order to fit together. Preferably the keyways 12 are broached to accurate dimensions after first being pressed out in a die, as above described, but otherwise the parts may be accurately shaped from sheet metal without machining operations. Of course the spider may be fastened to the rim either by having its outer ends inserted in the rim or screwed thereto, both methods of fastening being common.

While the form of embodiment of the present invention as herein disclosed, constitutes a preferred form, it is to be understood that other forms might be adopted, all coming within the scope of the claims which follow.

What is claimed is as follows:

1. A steering wheel spider comprising four pressed metal spokes and a pressed metal hub, said hub comprising: an inner sleeve having two diametrically opposed keyways pressed therein thereby forming two radially extending fins on the outer surface of said sleeve, an outer sleeve telescoped upon said fins thereby forming an annular space between said sleeves, said annular space being interrupted by said fins, said outer sleeve having an outwardly radially extending flange at its upper edge; said spokes having their inner ends abutting each other on radial lines and resting upon said flange, each spoke having a downwardly turned lug extending within said annular space; and means for rigidly securing said spokes to said flange.

2. A steering wheel spider comprising: an inner sleeve, an outer sleeve telescoped therewith but leaving an annular space between said sleeves, said outer sleeve having a radially extending flange at its upper edge, and a plurality of spokes having their inner ends abutting upon radial lines and lying upon said flange, said spokes each having a depending lug inserted within said annular space, said inner sleeve having a lateral torque carrying projection extending into said annular space, and means for rigidly holding all the parts together.

3. A steering wheel spider built up from pressed metal parts comprising: a pressed metal sleeve adapted to fit upon a steering shaft and having a longitudinal keyway pressed therein thereby forming a torque carrying projection on the outer surface of said sleeve, an outer sleeve telescoped upon said inner sleeve and leaving an annular space between said sleeves, pressed metal spokes having their inner ends turned downward and fitting within said annular space and engaging said projection, and means for holding the spokes and sleeves rigidly together.

4. A steering wheel spider built up from pressed metal parts comprising: a pressed metal sleeve adapted to fit upon a steering shaft and having a longitudinal keyway pressed therein thereby forming a torque carrying projection on the outer surface of said sleeve, an outer sleeve telescoped upon said inner sleeve and leaving an annular space between said sleeves, pressed metal spokes having their inner ends turned downward, and having a tight fit within said annular space and engaging said projection.

5. A steering wheel spider built up from pressed metal parts comprising: a pressed metal sleeve adapted to fit upon a steering shaft and having a longitudinal keyway pressed therein thereby forming a torque carrying projection on the outer surface of said sleeve, an outer sleeve telescoped upon said inner sleeve and leaving an annular space between said sleeves, pressed metal spokes having their inner ends turned downward and having a tight fit within said annular space and engaging said projection, and a top cover plate over the built up hub portion and inner ends of the spokes.

6. A steering wheel spider built up from pressed metal parts comprising: a pressed metal sleeve adapted to fit upon a steering shaft and having a longitudinal keyway pressed therein thereby forming a torque carrying projection on the outer surface of said sleeve, an outer sleeve telescoped upon said inner sleeve and leaving an annular space between said sleeves, pressed metal spokes having their inner ends turned downward and having a tight fit within said annular space and engaging said projection, and top and bottom outer casings surrounding the built up hub and inner ends of the spokes.

7. The steps in the method of making a handwheel spider comprising: providing a suitable keyway in a ductile metal sleeve by deforming the metal and thereby also providing a longitudinal fin on the outer surface of said sleeve, telescoping an outer sleeve over said first sleeve leaving an annular space therebetween into which said fin projects, providing spider spokes having depending lugs on their inner ends and pressing said depending lugs within said annular space to substantially fill said space.

8. The steps in the method of making a handwheel spider comprising: providing a suitable keyway in a ductile metal sleeve of relatively thin metal by deforming the metal and thereby also providing a longitudinal fin on the outer surface of said sleeve, telescoping an outer sleeve over said first sleeve leaving an annular space therebetween into which said fin projects, providing spider spokes having depending lugs on their inner ends and inserting said lugs within said annular space to substantially fill said space, and then spot welding said spokes in place to more securely hold all the parts rigidly together.

In testimony whereof I hereto affix my signature.

HARVEY D. GEYER.